United States Patent [19]

Takeda

[11] Patent Number: 5,455,710
[45] Date of Patent: Oct. 3, 1995

[54] OPTICAL AMPLIFIER FOR AMPLIFYING A SIGNAL LIGHT AND A CONTINUOUS LIGHT HAVING A WAVE LENGTH DIFFERENT FROM THE SIGNAL LIGHT

[75] Inventor: Toshiyuki Takeda, Tokyo, Japan

[73] Assignee: Ando Electric Co., Ltd., Tokyo, Japan

[21] Appl. No.: 378,764

[22] Filed: Jan. 26, 1995

Related U.S. Application Data

[63] Continuation of Ser. No. 70,077, Jun. 1, 1993, abandoned.

[30] Foreign Application Priority Data

Jun. 12, 1992 [JP] Japan ................. 4-179241

[51] Int. Cl.$^6$ ............... G02B 6/26; H01S 3/103
[52] U.S. Cl. ................. 359/341; 359/337; 372/6
[58] Field of Search ................. 359/337, 341; 330/4; 372/6, 33

[56] References Cited

U.S. PATENT DOCUMENTS

| | | | |
|---|---|---|---|
| 4,879,761 | 11/1989 | Webb | 372/70 |
| 5,050,949 | 9/1991 | Di Giovanni et al. | 359/341 |
| 5,117,303 | 5/1992 | Desurvire et al. | 359/341 |
| 5,128,800 | 7/1992 | Zirngibl | 359/341 |
| 5,229,876 | 7/1993 | Fatehi et al. | 359/160 |

OTHER PUBLICATIONS

*The Journal of Applied Physics of Japan*, "Optical Fiber Amplification With Er–doped Optical Fiber and its Application", vol. 59, No. 9, pp. 1175–1191 (1990) (Partial Translation).

Primary Examiner—Nelson Moskowitz
Attorney, Agent, or Firm—Panitch Schwarze Jacobs & Nadel

[57] ABSTRACT

In an optical amplifier a signal light of a wave length $\lambda$ a is coupled with a continuous light of a wave length $\lambda$ b and amplified by an optical fiber amplifier. Then, the amplified output light is subjected to filtration to select the light of the wave length $\lambda$ a alone, so that the ASE power is reduced and the dynamic range of the optical fiber amplifier from the minimum light receipt power to the saturation after amplification can be enlarged, and, in the case that the signal light is pulse-modulated, the deterioration of the extinction ratio is minimized.

3 Claims, 3 Drawing Sheets

5,455,710

OPTICAL AMPLIFIER FOR AMPLIFYING A SIGNAL LIGHT AND A CONTINUOUS LIGHT HAVING A WAVE LENGTH DIFFERENT FROM THE SIGNAL LIGHT

This application is a continuation of Ser. No. 08/070,077 filed Jun. 1, 1993 abandoned.

BACKGROUND OF THE INVENTION

1. Field of the Invention

This invention relates to an optical amplifier for amplifying a signal light and a continuous light having a different wave length. More particularly, the present invention relates to an optical amplifier which functions to couple a signal light and a continuous light and amplifying the coupled light so as to reduce the effect of ASE (Amplified Spontaneous Emission) generated in the optical fiber amplifier, to expand dynamic range of the output light and to alleviate the deterioration of the extinction ratio when the signal light is pulse-modulated light.

2. Prior Art

The conventional optical amplifier will first be briefly explained by making reference to FIG. 7. In this figure, 1 is an optical source 1 which outputs a signal light 11 having a wave length $\pi$ a, 4 is an optical fiber amplifier and 5 is an optical filter. The optical fiber amplifier 4 amplifies the signal light 11 from the optical source 1. The output of the optical fiber amplifier 4 includes ASE generated in the signal light 11 and the optical fiber amplifier 4. Detected light involves beat noise between them as well as that among the spectral components of the ASE. The optical filter 5 extracts the light component having a wavelength of $\pi$ a from the output of the optical fiber amplifier 4, whereby the beat noise resulting from the spectral components of the ASE is reduced.

Next, the input/output characteristics of the system in FIG. 7 will be explained in reference to FIG. 8. In this figure, the abscissa is the input optical power and the ordinate is the output optical power. When the input optical power is small the output optical power increases with the increase in the input optical power. When the input optical power becomes sufficiently large the output light power reaches a saturation as depicted by a power curve 16. The level 17 of the curve 16 is the minimum light receipt optical power which is restricted by the beat noise between the signal light 11 and the beat noise between the spectral components of the ASE, and the level 18 is the maximum receipt optical power right prior to the saturation of the output signal 11 of the optical fiber amplifier 4. Incidentally, beat noise is described in FIG. 9 of Masataka Nakazawa " Optical Fiber Amplification with Er-Doped Optical Fiber and Its Application "Applied Physics of Japan",Vol. 59, No.9 (1990).

Problem to be solved by the present invention

With the construction in FIG. 7, even if it is desired to use the signal light 11 in a wide dynamic range, the power of the ASE is large when the power of the signal light 11 is small and, accordingly, it is not possible to expand the dynamic range, that is, the range between the level 17 and the level 18 shown in FIG. 8. In addition, if the signal light 11 has been pulse-modulated, the extinction ratio is deteriorated by the ASE in the pass band of the optical filter 5.

Accordingly, a principal object of the invention is to reduce the effect of ASE generated in the optical fiber amplifier 4 so as to expand the dynamic range of the output light, and, in the case of the signal light being pulse-modulated, deterioration of the extinction ratio is suppressed.

Another object of the present invention is to provide an optical amplifier which amplifies the signal light 11 having a wavelength $\pi$ a simultaneously with another continuous light having a wavelength $\pi$ b in the optical fiber amplifier 4 and only the light having the wavelength $\pi$ a is selected by the optical filter 5, which achieves the above-mentioned object of the invention.

Means to solve the problem.

To achieve the objects, the present invention provides an optical fiber amplifier comprising an optical source for generating a signal light having a wavelength $\pi$ a, an optical source for generating a continuous light having a wavelength $\pi$ b, an optical coupler for coupling the signal light with the continuous light, an optical fiber amplifier for amplifying the output from the optical coupler, and a optical filter for extracting only the light having the wavelength $\pi$ a.

PREFERRED EMBODIMENT OF THE INVENTION

A preferred embodiment of the present invention will now be explained in detail by making reference to the attached drawings.

Figure 1:
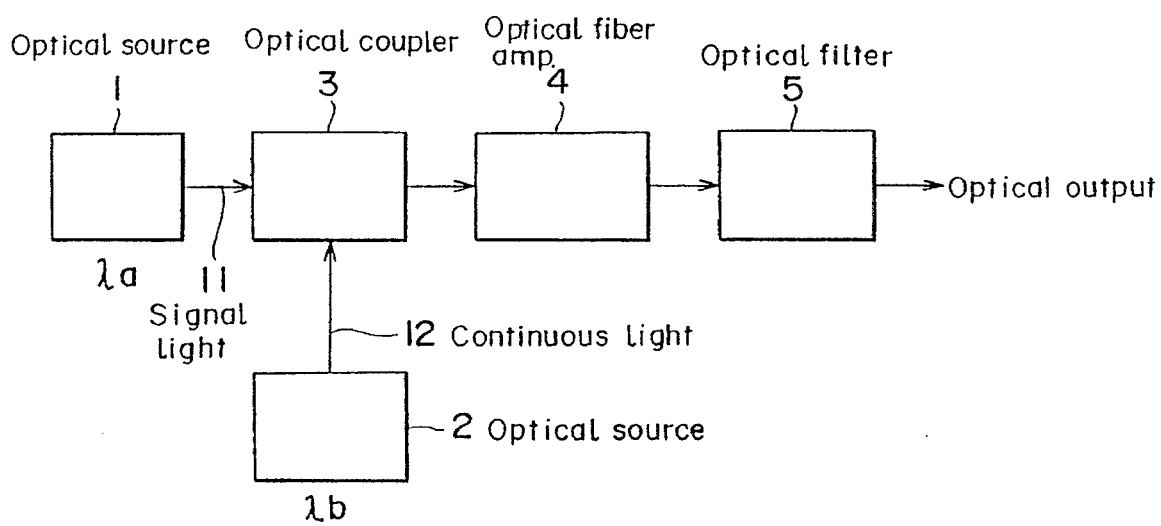
FIG. 1 shows a block diagram of the optical amplifier according to the present invention.
Figure 7:
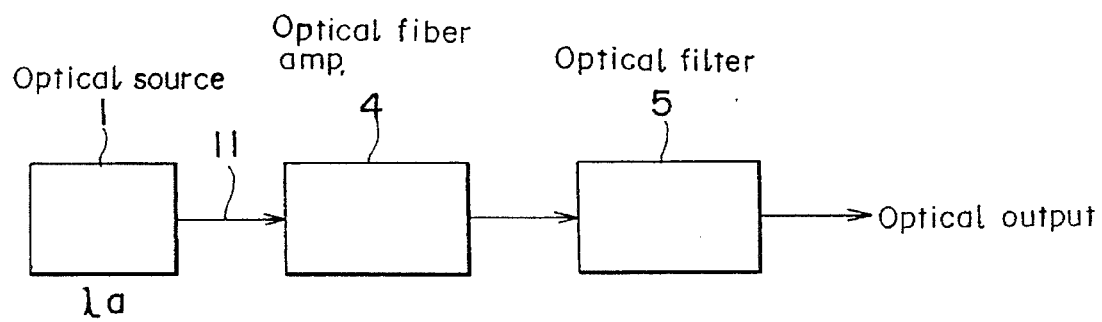
FIG. 7 shows a block diagram of the optical amplifier according to the prior art optical amplifier.
Figure 8:
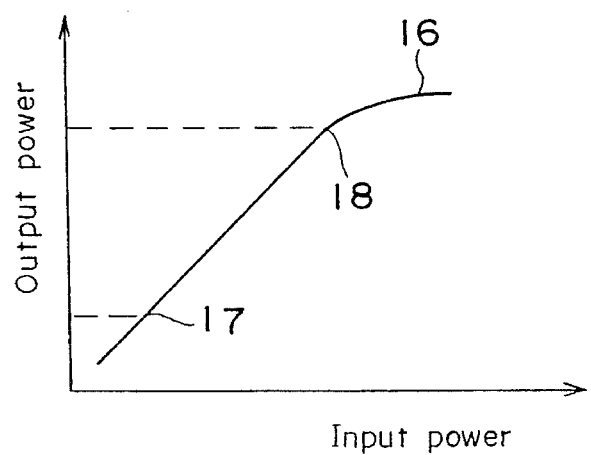
FIG. 8 illustrates input/output characteristics of the optical amplifier of FIG. 7.

Referring to FIG. 1, an optical amplifier according to the present invention comprises an optical source 1 which generates a signal light 11 having a wavelength $\pi$ a, an optical source 2 which generates a continuous light 12 having a wavelength $\pi$ b which is different from $\pi$ a, an optical coupler to couple or combine the signal light 11 with the continuous light 12, an optical fiber amplifier 4 which amplifies the output from the optical coupler 3, and an optical filter 5 for extracting only the light having a wavelength $\pi$ a. As seen from the comparison between FIG. 1 and FIG. 7, the optical amplifier according to the present invention is obtained by modifying the conventional amplifier of FIG. 7 by adding the light source 2 and the optical coupler 3.

The optical source 1 is a laser optical source and the optical source 2 is a laser optical source which continuously outputs a continuous light 12 having a wavelength $\pi$ b different from that of the signal light 11 within the band width of the optical fiber amplifier 4. It should be noted that the light 12 from the optical source 2 is deemed continuous even if it is intensity-modulated with a cycle which is sufficiently shorter than the life of photons in the optical fiber amplifier 4.

The optical coupler 3 couples the signal light 11 and continuous light 12. The optical fiber amplifier 4 amplifies the output of the coupler 13. The optical fiber amplifier 4 is described in the above-cited literature as well as in Tatsuya Takada "Optical Fiber Amplification Modules" OQE 90-80 and Tetsuya Sakai et al "High Conversion 1.48 μm Excited E Γ -Doped Optical Fiber Amplifier", 1991, Denshi Joho Tsushin Gakkai, Spring Meeting C-306.

An example of the embodiment of the present invention will now be described in connection with FIG. 2. In this example, as the optical source 1 used is a laser diode of a wavelength of 1.554 μm the optical source 2 used is a laser diode having a wavelength of 1.533 μm, and as the optical coupler 3 used is an optical fiber coupler.

Next, output spectra of the optical coupler 3 of FIG. 2 will be explained with reference to FIG. 3 in which the spectrum 21 is that from the optical source 2 and the spectrum 22 is from the optical source 1.

Figure 4:
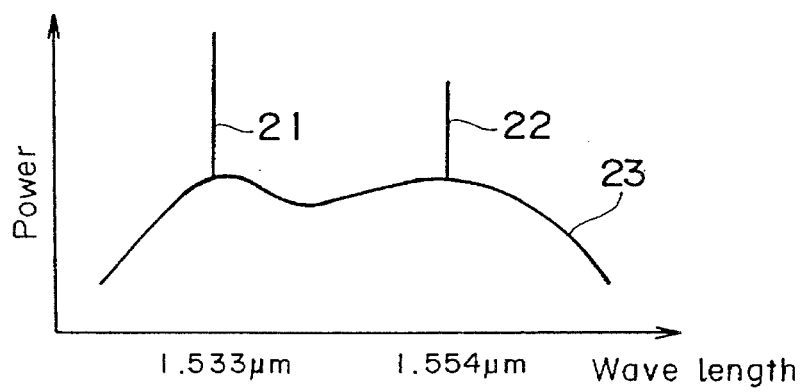
FIG. 4 illustrates the output spectrum of the optical fiber amplifier 4.

Next, the spectra of the output of the optical fiber amplifier 4 in FIG. 2 will be explained with reference to FIG. 4 in which the spectrum 21 is that from the optical source 2 and the spectrum 22 is from the optical source 1. The spectrum 23 is due to ASE. Amplification of the signal light 11 in the optical fiber amplifier 4 gives rise to an output of the signal light 11 as well as the ASE.

According to FIG. 11(a) of Masataka Nakazawa " Optical Fiber Amplification with Er-Doped Optical Fiber and Its Application " Applied Physics of Japan", Vol. 59, No. 9 (1990), with increase in the input signal light level the beat noise of ASE is reduced, which means that the power of the ASE per se is decreased with the increase in the input signal light level.

The present invention reduces the ASE from the output of the optical fiber amplifier 4 by coupling the signal 11 of a wavelength π a and the continuous light 12 of a wavelength π b by the optical coupler 3 prior to inputting the signal light 11 into the optical fiber amplifier 4, thereby reducing the ASE from the output of the optical fiber amplifier 4. Then, the signal light 1 alone is outputted from the system after passing through the optical filter 5, with the result that a broader dynamic range is obtained or the extinction rate is suppressed when the signal light 1 is pulse-modulated.

Figure 5:
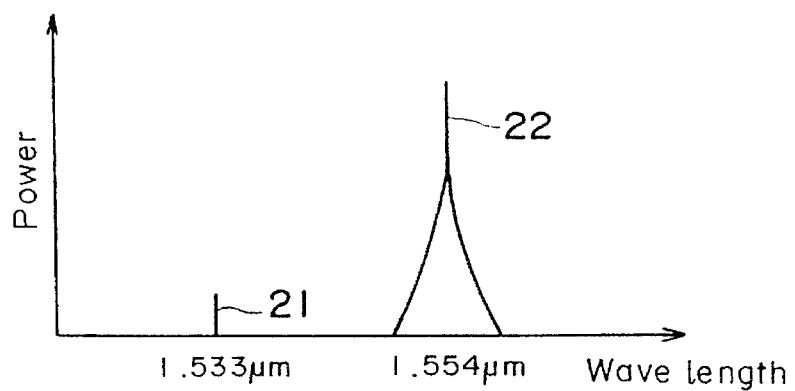
FIG. 5 illustrates the output spectrum of the optical filter 5 of FIG. 2.

FIG. 5 illustrates the output spectra of from the optical filter 5. By setting the pass band of the optical filter 5 near 1.554 μm, only the spectrum 22 around the wave length 1.554 μm can be taken out as shown. The optical filter 5 may be IFOS-1560AL(tradename) sold by Kogaku Giken K.K.in Japan.

Figure 2:
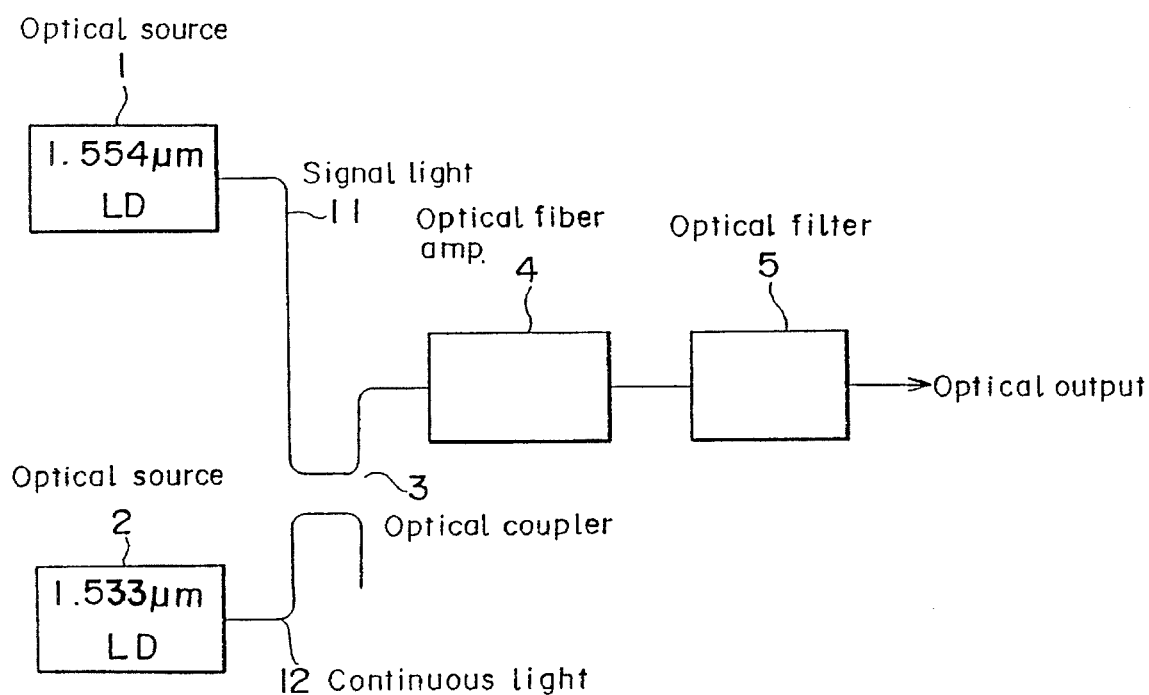
FIG. 2 is an embodiment of the optical amplifier of FIG. 1.
Figure 3:
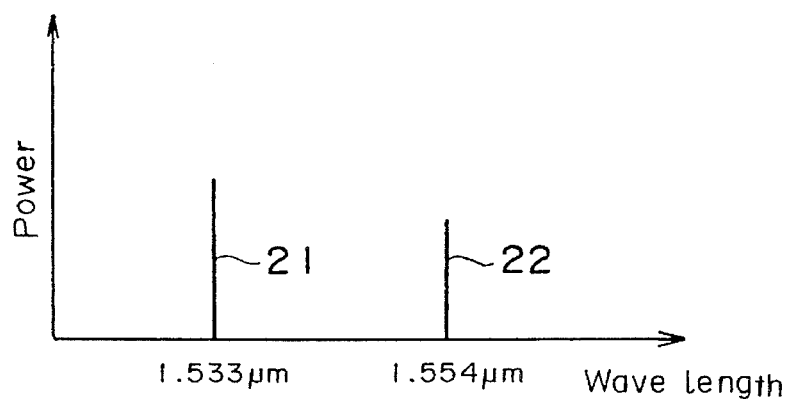
FIG. 3 illustrates the output spectrum of the optical coupler 4 of FIG. 2.
Figure 6:
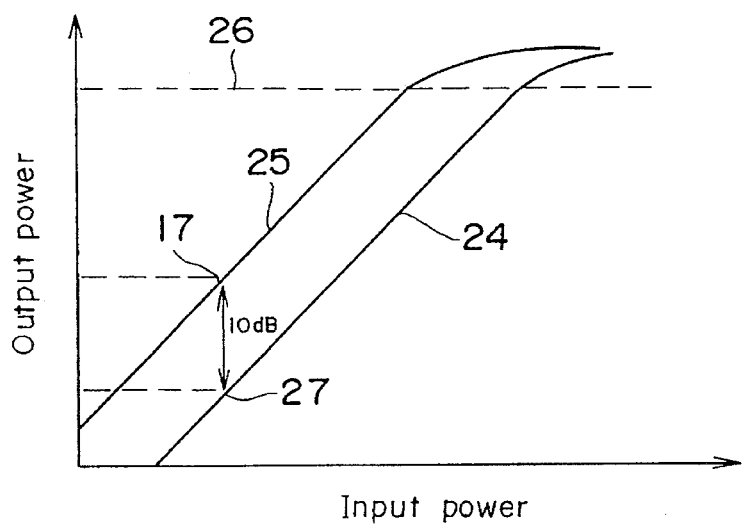
FIG. 6 shows output characteristics of FIG. 2 and FIG. 7.

Next, the input/output characteristics of FIG. 2 is explained in reference to FIG. 6. The curve 24 shows the characteristic of the system in FIG. 2 and the curve 25 shows that of FIG. 7. Comparison between these curves 24 and 25 shows that the output light levels are almost the same toward the saturation at a greater light power input. Comparison between the ASE powers of the curve 24 and the curve 25 shows that the curve 24 has an ASE power less by about 10 dB than the curve 25. That is, the energy used for amplifying the natural emission light is used for amplification of the output light of the optical source 2. Accordingly, when the signal light 1 is pulse-modulated, deterioration of the extinction rate can be suppressed by 10 dB corresponding to the reduction in the ASE power. The dotted line 26 in FIG. 6 is the maximum output power level at which no distortion is observed.

The level 17 is the minimum light receipt power of the conventional system and the level 27 is the minimum light receipt power of FIG. 2. When the minimum light receipt power is restricted by the beat noise between the signal light 11 and the ASE or beat noise among the spectral components of the ASE, the curve 24 of FIG. 6 has an improved minimum light power by 10 dB or so lower than the curve 25. Accordingly, the dynamic range, i.e., the range from the minimum light receipt power up to the distortion area of the signal after amplification, is enlarged by about 10 dB. In other words, the dynamic range for the curve 24 is broader by 10 dB than for the curve 25.

Advantage resulting from the present invention.

According to the present invention, a signal light of a wave length π a is coupled with a continuous light of a wave length π b and amplified by an optical fiber amplifier and the amplified output light is subjected to filtration to select the light of the wave length π a alone, so that the ASE power is reduced and the dynamic range of the optical fiber amplifier from the minimum light receipt power to the saturation after amplification can be enlarged, and, in the case that the signal light is pulse-modulated, the deterioration of the extinction ratio is minimized.

I claim:

1. An optical amplifier for amplifying a signal light which comprises:

a first optical source for generating a signal light having a wavelength π a;

a second optical source for generating a continuous light having a wavelength π b which is different from π a;

an optical coupler for optically coupling the signal light and the continuous light to output a mixed signal light;

an optical fiber amplifier for amplifying the mixed signal light, said amplifier introducing an amplified spontaneous emission (ASE); and an optical filter for allowing passage of the signal light having the wavelength π a and preventing passage of other wavelengths including the continuous light having the wavelength π b, whereby noise from the ASE is generally suppressed and a dynamic range of the signal light from the noise derived from the ASE is controlled by the use of the continuous light.

2. An optical amplifier for amplifying a signal light according to claim 1, wherein the continuous light having the wavelength π b is an intensity-modulated light.

3. An optical amplifier for amplifying a signal light according to claim 1, wherein the signal light having the wavelength π a is a pulse-modulated light.

* * * * *